(12) United States Patent
Lyu et al.

(10) Patent No.: US 8,123,553 B2
(45) Date of Patent: Feb. 28, 2012

(54) CONDUCTOR BASE AND FINGER MODULE OF AIR CIRCUIT BREAKER

(75) Inventors: Gae Goo Lyu, Cheongju-si (KR); Ki Cheol Na, Cheongju-si (KR); Myoung Soo Kim, Cheongju-si (KR); Hyun Jae Kim, Cheongju-si (KR)

(73) Assignee: LS Industrial Systems Co., Ltd., Seoul (KR)

( * ) Notice: Subject to any disclaimer, the term of this patent is extended or adjusted under 35 U.S.C. 154(b) by 97 days.

(21) Appl. No.: 12/651,954

(22) Filed: Jan. 4, 2010

(65) Prior Publication Data

US 2010/0105255 A1  Apr. 29, 2010

Related U.S. Application Data

(63) Continuation-in-part of application No. 11/872,959, filed on Oct. 16, 2007, now abandoned.

(30) Foreign Application Priority Data

Oct. 17, 2006 (KR) .................. 10-2006-0101058
Oct. 17, 2006 (KR) .................. 20-2006-0027976 U

(51) Int. Cl.
*H01R 13/73* (2006.01)

(52) U.S. Cl. .................. 439/566; 439/787; 200/254

(58) Field of Classification Search .................. 439/566, 439/573, 660, 819, 787; 200/254, 15, 282, 200/554
See application file for complete search history.

(56) References Cited

U.S. PATENT DOCUMENTS 3,427,419 A * 2/1969 Findley, Jr. .................. 200/255
(Continued)

*Primary Examiner* — Tulsidas C Patel
*Assistant Examiner* — Travis Chambers
(74) *Attorney, Agent, or Firm* — Lee, Hong, Degerman, Kang & Waimey

(57) ABSTRACT

A conductor base coupled to a finger module of an air circuit breaker. Since the connector of the conductor base has the curved surface formed on a side of an end portion thereof and tooth-coupled with the contactor of the finger module, the contactor of the finger module has another curved surface corresponding to the curved surface of the connector and the contactor is elastically supported in a vertical direction by the plate spring to allow both end portions of the contactor to perform a vertical elastic movement relative to a longitudinal center of the contactor. The present invention can prevent damages due to a mechanical impact between the connector of the conductor base and the contactor of the finger module, which may occur while the breaker terminal is inserted into the finger module, to thereby extend the lifespan of the conductor base and the finger module.

5 Claims, 7 Drawing Sheets

U.S. PATENT DOCUMENTS 5,025,121 A * 6/1991 Allen et al. .................. 200/275
5,853,305 A * 12/1998 Bedrossian et al. .......... 439/787
6,024,611 A * 2/2000 Giuseppe ...................... 439/819
6,139,347 A * 10/2000 Nebon et al. .................. 439/251

* cited by examiner

# CONDUCTOR BASE AND FINGER MODULE OF AIR CIRCUIT BREAKER

CROSS-REFERENCE TO RELATED APPLICATIONS

The present application is a continuation-in-part of U.S. patent application Ser. No. 11/872,959, filed on Oct. 16, 2007, now abandoned, which claims the benefit of earlier filing date and right of priority to Korean Application Numbers 10-2006-0101058, filed on Oct. 17, 2006, and 20-2006-0027976, filed on Oct. 17, 2006, the contents of which are all incorporated by reference herein in their entirety.

BACKGROUND

1. Technical Field

The present invention relates to a finger module of an air circuit breaker, and more particularly, a conductor base and a finger module of an air circuit breaker, in which structures of the conductor base and the finger module coupled to the conductor base can he improved to extend the lifespan thereof, and in which a contact area of the conductor base and the finger module can be expanded to reduce an electric resistance to thereby reduce the amount of heat generated.

2. Background Art

Hereinafter, a conductor base and a finger module of an air circuit breaker according to a prior art will be described with reference to the accompanying drawings.

FIG. 1 is a perspective view of a structure of a conductor base according to the prior art, FIG. 2 is a perspective view of a structure of a finger module according to the prior art, FIGS. 3 to 5 are exploded plan views of components of the finger module according to the prior art, and FIG. 6 is a plan view showing a combined structure between the conductor base and the finger module.

First, referring to FIG. 1 the conductor base according to the prior art will be described. The conductor base includes: a coupling plate 10 having a number of coupling holes 11 formed on the peripheral portion thereof; and a plate-type connector 20 protruding to a predetermined height in a width direction of the coupling plate 10.

The coupling plate 10 is a rectangular plate-type body having a number of the coupling holes 11 formed on the peripheral portion thereof to fixedly couple the coupling plate 10 to a main body of the air circuit breaker by means of screw-coupling.

The connector 20 is formed in the same width as the coupling plate 10, and protrudes from the central portion of the coupling plate 10 to the predetermined height in the width direction thereof.

As shown in FIG. 4, in the conductor base, the coupling plate 10 is screw-coupled and fixed to the inside of the body of the air circuit breaker, a portion of a contactor 60 of the finger module, which will be described later, is coupled to the connector 20, and a breaker terminal 40, which will be described later, is selectively inserted to or withdrawn from the other portion of the contactor 60 of the finger module.

Referring to FIGS. 2 to 6, the finger module will be described. The finger module includes: a number of contactors 60 laminated in a width direction of the finger module; a supporter 70 having insertion openings 71 for supportively inserting a number of the laminated contactors 60 thereto; plate springs 80 for allowing both ends of the contactor to perform a vertical elastic movement relative to the longitudinal center thereof; and a separation-preventing member 90 for preventing the plate spring 80 from escaping from the contactor 60.

The contactor 60 is formed in a plate shape. A portion of the contactor 60 is in contact with the connector 20 of the conductor base and the other portion of the contactor 60 is in contact with the breaker terminal 40 so that the contactor 60 passes electricity through the connector 20 and the breaker terminal 40. In addition, the contactor 60 includes round-shaped coupling holes 61 formed at both end portions thereof for coupling the plural contactors 60 laminated in the width direction thereof.

The contactor 60 further includes an insertion groove 62 formed at the longitudinal center of the lower end thereof so as to be retained on the lower end of the insertion opening 71 of the supporter 70; and retaining protrusions 63 formed at both sides of the longitudinal upper end of the contactor 60 and having a predetermined height to allow both end portions of the plate spring 80 to be retained by the retaining protrusions.

The supporter 70 is a rectangular plate-type body having a number of the insertion openings 71 for fixedly inserting the contactor 60, the plate spring 80 and the separation-preventing member 90 thereto, and includes a number of screw holes 72 arranged at the longitudinal center thereof.

The plate spring 80 is fit to the upper end of the laminated contactors 60, and includes a bent retaining hook 81 engaging with the retaining protrusion 63 of the contactor 60.

The separation-preventing member 90 has the same form as that of the plate spring 80, is additionally mounted on the outer surface of the plate spring 80, and includes a bent separation-preventing hook 91 formed at a side end portion thereof and having an angle larger than that of the retaining hook 81 of the plate spring 80.

As shown in FIG. 4, in the finger module having the above configuration, the connector 20 of the conductor base is coupled to a side of the contactor 60 of the finger module, and the breaker terminal 40 is selectively inserted to or withdrawn from the other side of the contactor 60 of the finger module.

However, in case of the conductor base and the finger module according to the prior art described above, since the connector 20 of the conductor base, which is in contact with the contactor 60 of the finger module, is formed flat and the contactor 60 of the finger module, which is in contact with the connector 20 of the conductor base, is also formed flat, thus an electric resistance rises due to a small contact area. Therefore, the conductor base and the finger module according to the prior art have a problem in that the amount of heat generated is increased when electricity is applied to the air circuit breaker.

In addition, since the area where the contractor 60 of the finger module is in contact with the connector 20 of the conductor base is flat, the other side of the finger module relative to the contact face is not easily rotated vertically, and so, the breaker terminal (not shown) is not easily inserted to and withdrawn from he other side of the finger module to thereby reduce the lifespan of the product.

SUMMARY

Accordingly, the present invention has been made to solve the above-mentioned problems occurring in the prior arts, and it is an object of the present invention to provide a conductor base and a finger module of an air circuit breaker, in which structures of the conductor base and the finger module coupled to the conductor base can be improved to extend the lifespan thereof, and in which a contact area of the conductor base and the finger module can be expanded to reduce an electric resistance to thereby reduce the amount of heat generated.

To accomplish the above object, according to the present invention, there is provided a conductor base of an air circuit breaker comprising: a coupling plate having a plurality of coupling holes formed on the peripheral portion thereof; and a connector protruding to a predetermined height in a width direction of the coupling plate, the connector having a curved surface formed on a side of an end portion thereof and tooth-coupled with a contactor of a finger module of the air circuit breaker.

It is preferable that the curved surface is formed in a concave shape inwardly from the connector.

It is preferable that the connector has a plurality of stepped jaws formed on the upper end of the connector and having a predetermined depth n a perpendicular direction to the width direction of the connector.

It is preferable that a connected portion between the coupling plate and the connector is curved.

It is preferable that he connector is aligned in plural numbers.

In another aspect of the present invention, a finger module of an air circuit breaker is provided. The finger module includes a plurality of contactors laminated in a width direction, in which each of the plurality of contactors has a curved surface formed at a position such that a contactor of the plurality of contactors is tooth-coupled with a connector of a conductor base. A plate spring supporter has at least one insertion opening for supportively inserting the plurality of contactors through the plate spring supporter. A plate spring provides elasticity such that two end portions of each of the plurality of contactors performs a vertical elastic movement relative to a longitudinal center of the plate spring. Additionally, a contactor supporter is inserted to a center of the plate spring supporter when n contact with a lower end center of each the plurality of contactors so that the two end portions of each of the plurality of contactors move vertically. The plurality contactors respectively contact the curved surface at a plurality of positions when tooth-coupled with the connector of the conductor base. Further, each of the plurality of contactors individually rotates at the position when tooth-coupled with the connector.

It is preferable that the curved surface is formed in a convex form toward the outside of the contactor.

It is preferable that the contactor has stepped seating jaws formed at both end portions thereof for seating both end portions of the plate spring 330 thereon.

It is preferable that the plate spring supporter has insertion openings formed at the centers of both sides thereof for inserting the contactor supporter thereto.

It is preferable that the contactor supporter has separation-preventing portions formed on a plate surface thereof for preventing escape of the contactor in such a way as to be in contact with the circumferential portion of the insertion openings when the contactor supporter is inserted into the insertion openings.

It is preferable that the separation-preventing portions are separation-preventing members formed in such a way that both end portions of the plate surface of the contactor supporter are cut and bent to be inclined at a predetermined angle relative to the plate surface of the contactor supporter.

It is preferable that the separation-preventing members are formed in such a way as to be opposite to each other relative to the longitudinal central line of the contactor supporter. As described above, since the connector of the conductor base has the curved surface formed on a side of an end portion thereof and tooth-coupled with the contactor of the finger module the contactor of the finger module has another curved surface corresponding to the curved surface of the connector and the contactor is elastically supported in a vertical direction by the plate spring to allow both end portions of the contactor to perform a vertical elastic movement relative to a longitudinal center of the contactor, the present invention can prevent damages due to a mechanical impact between the connector of the conductor base and the contactor of the finger module, which may occur while the breaker terminal is inserted into the finger module, to thereby extend the lifespan of the conductor base and the finger module. In addition, the present invention can reduce the amount of heat generated by decreasing an electric resistance since the contact area between the finger module and the conductor base is widened.

BRIEF DESCRIPTION OF THE DRAWINGS

The above and other objects, features and advantages of the present disclosure be apparent from the following detailed description of the preferred embodiments of the disclosure in conjunction with the accompanying drawings, in which.

DETAILED DESCRIPTION

Reference will be now made in detail to the preferred embodiment of the present disclosure with reference to the attached drawings.

Figure 1:
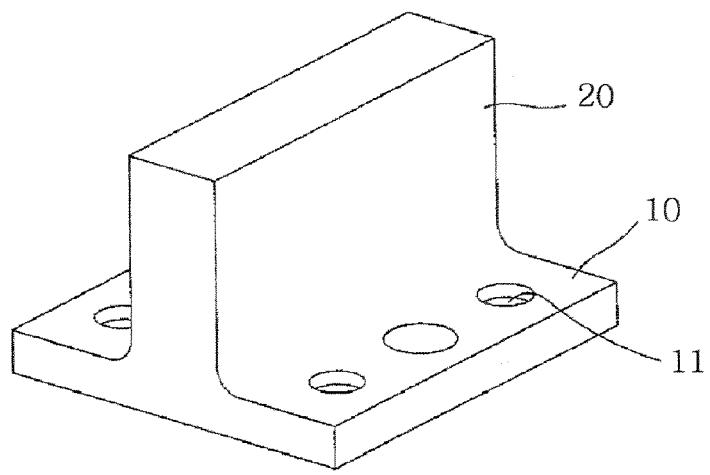
FIG. 1 is a perspective view of a structure of a conductor base according to a prior art.
Figure 2:
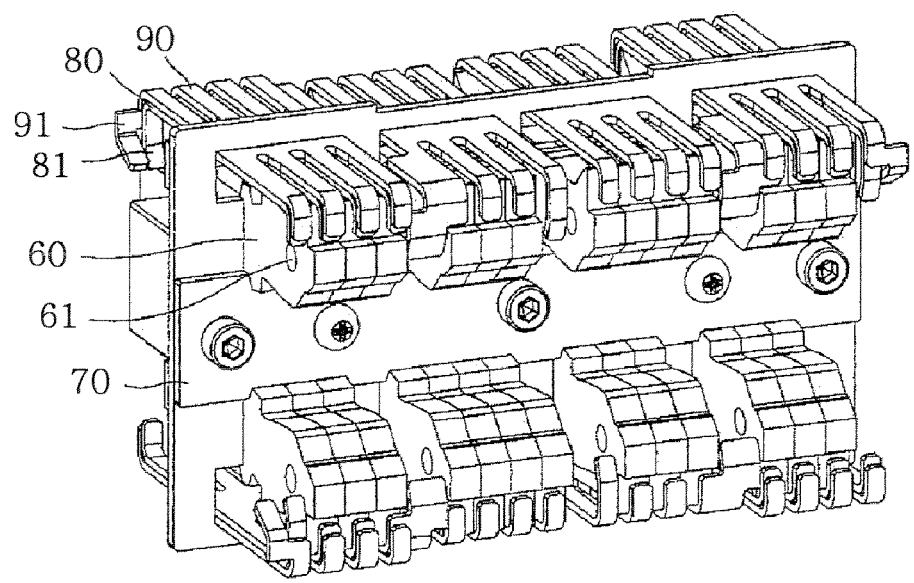
FIG. 2 is a perspective view a structure of a finger module according to prior art.
Figure 3:
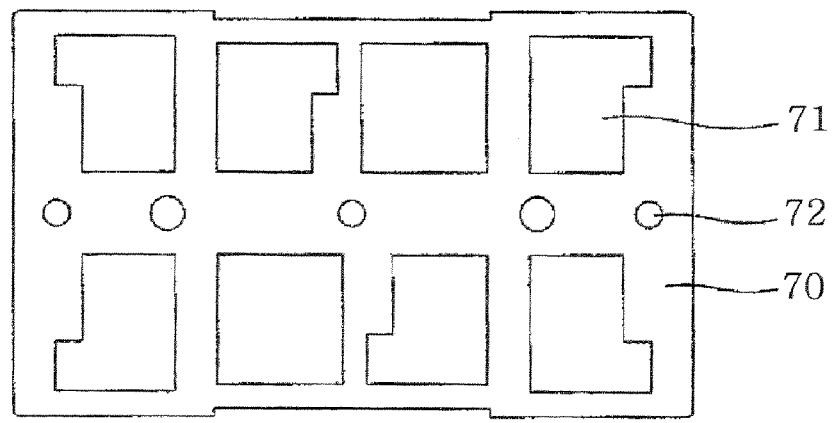
FIGS. 3 to 5 are exploded plan views of components of the finger module according to the prior art.
Figure 4:
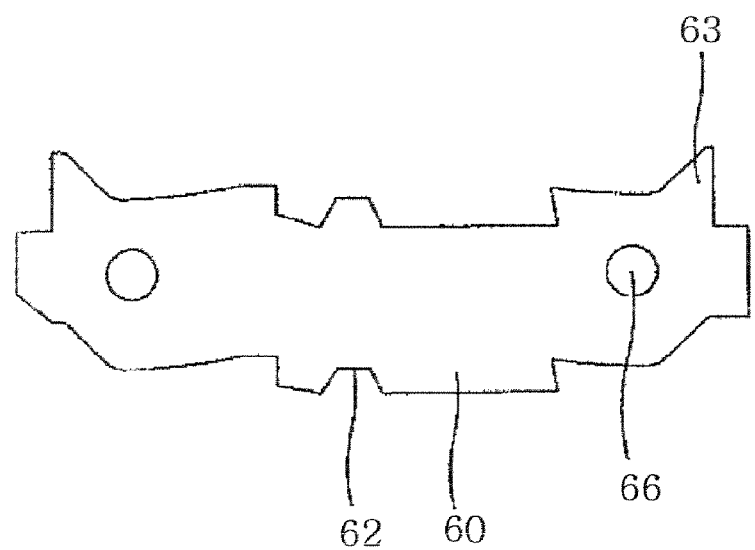
Figure 5:
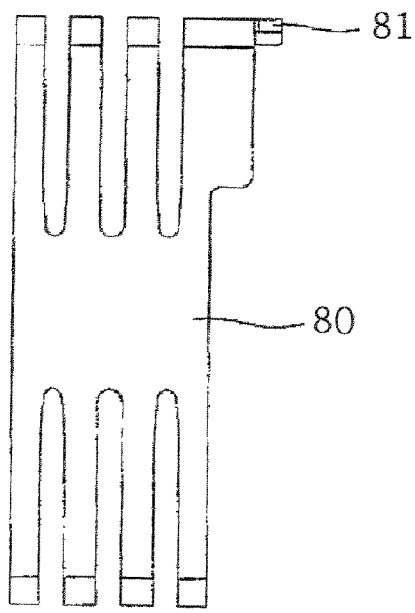
Figure 6:
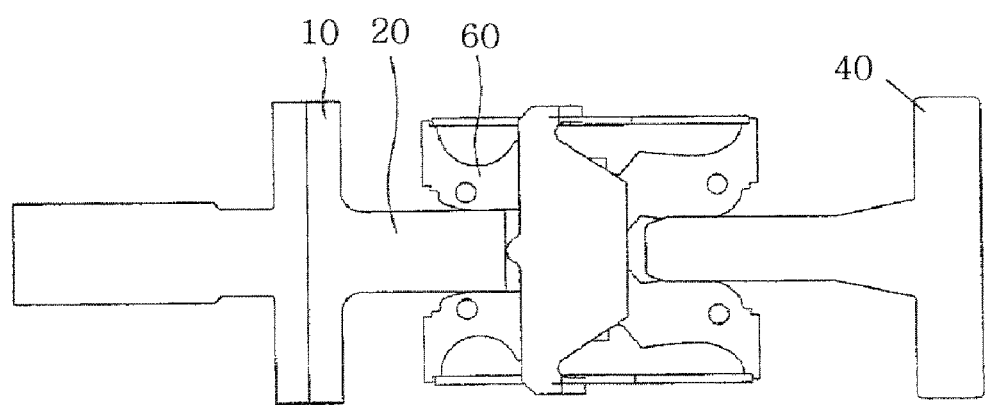
FIG. 6 is a plan view showing a combined structure between the conductor base and the finger module.
Figure 7:
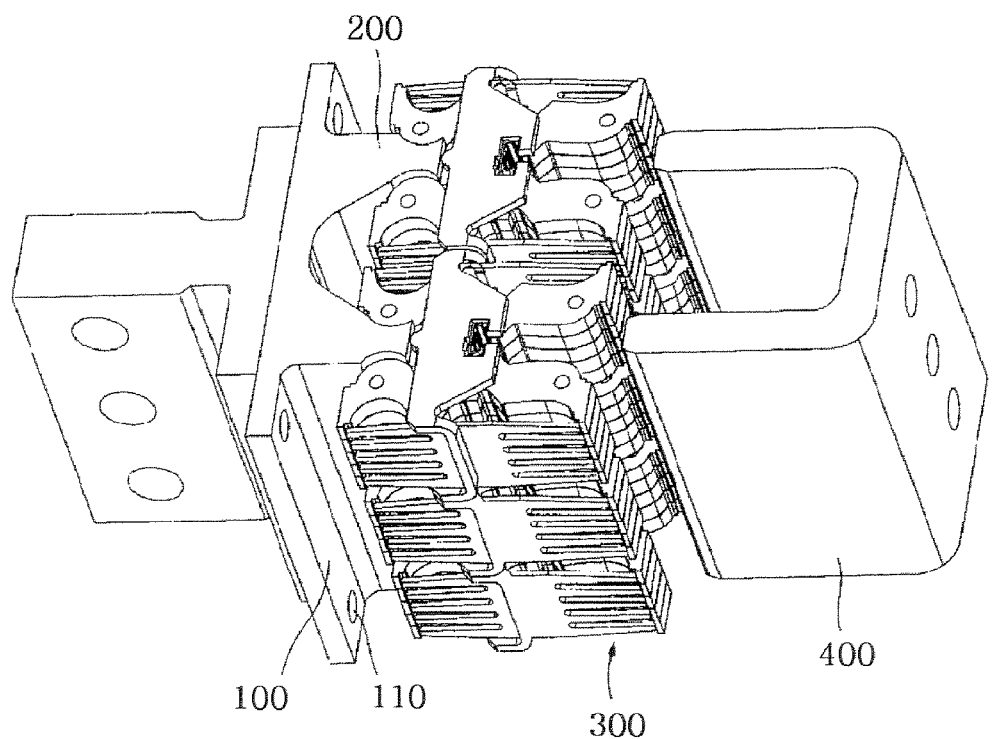
FIG. 7 is a perspective view showing a combined structure between a conductor base and a finger module according to a preferred embodiment of the present invention.
Figure 8:
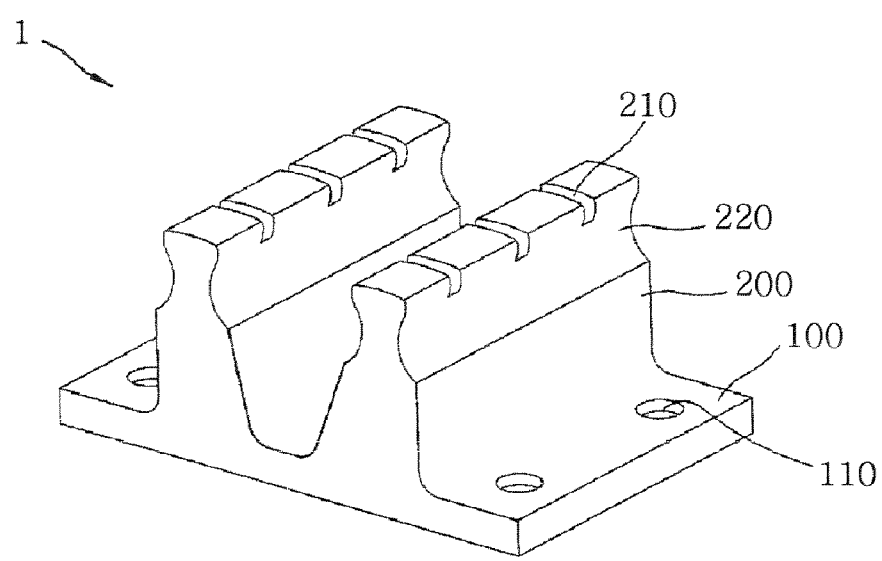
FIG. 8 is a perspective view of a structure of the conductor base shown in FIG. 7.
Figure 9:
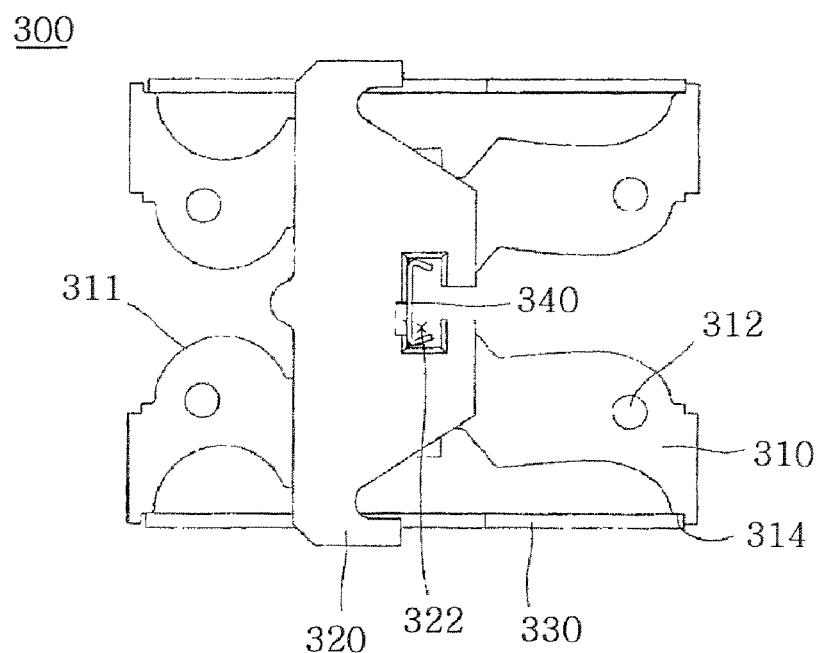
FIG. 9 is a plan view of the finger module shown in FIGS. 7.
Figure 10:
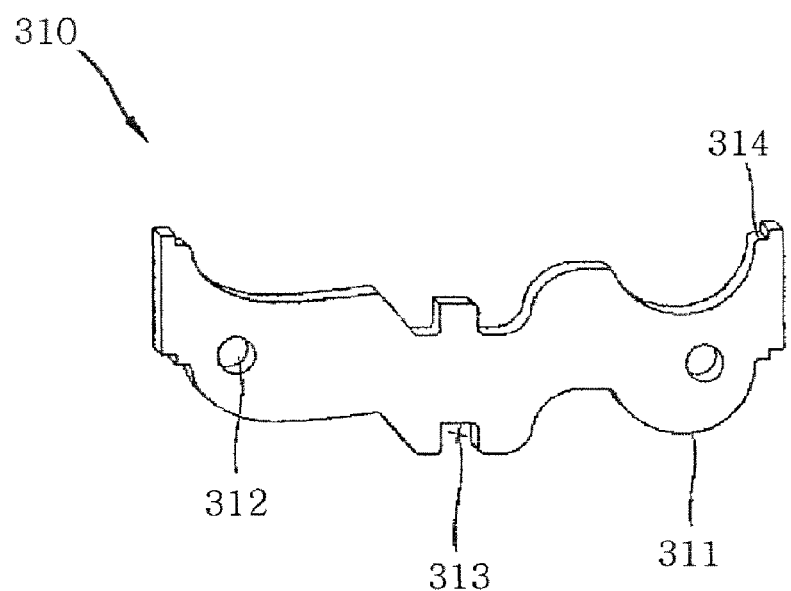
FIGS. 10 to 13 are exploded perspective views of components of the finger module shown in FIG. 7.
Figure 11:
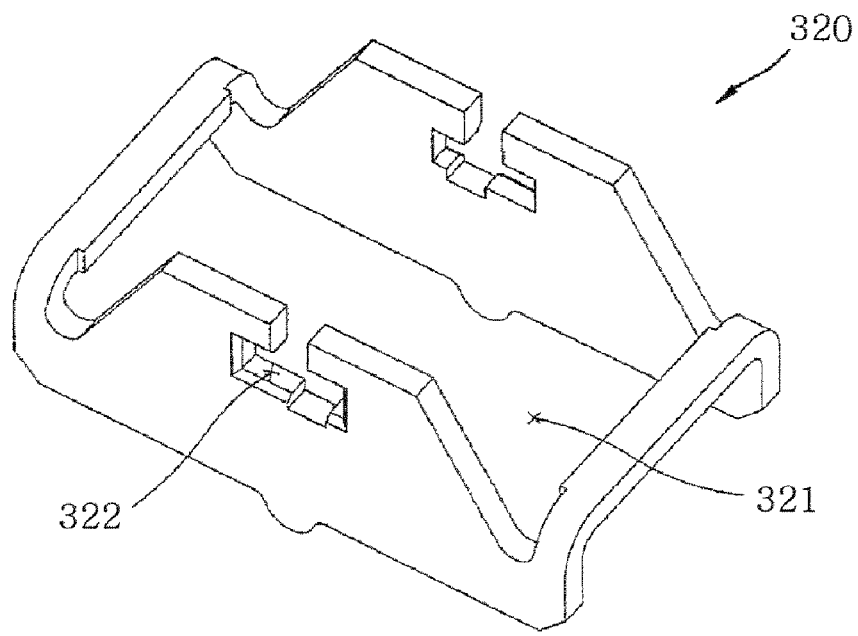
Figure 12:
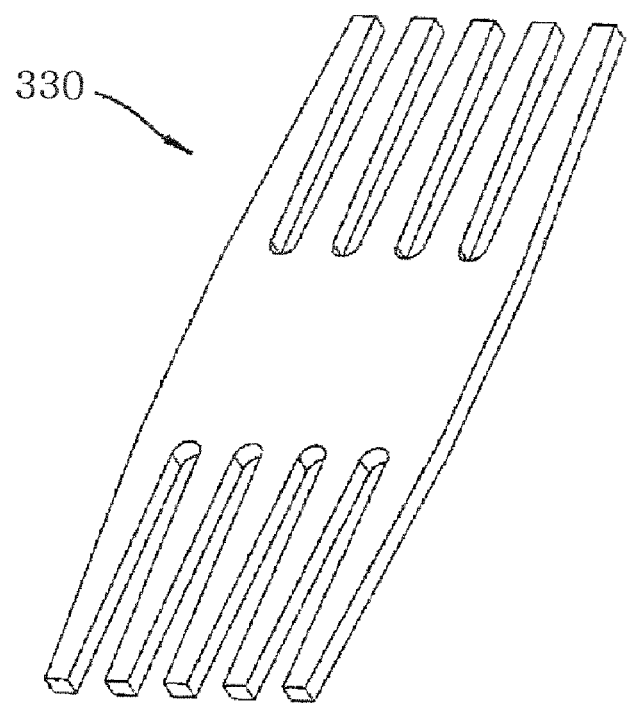
Figure 13:
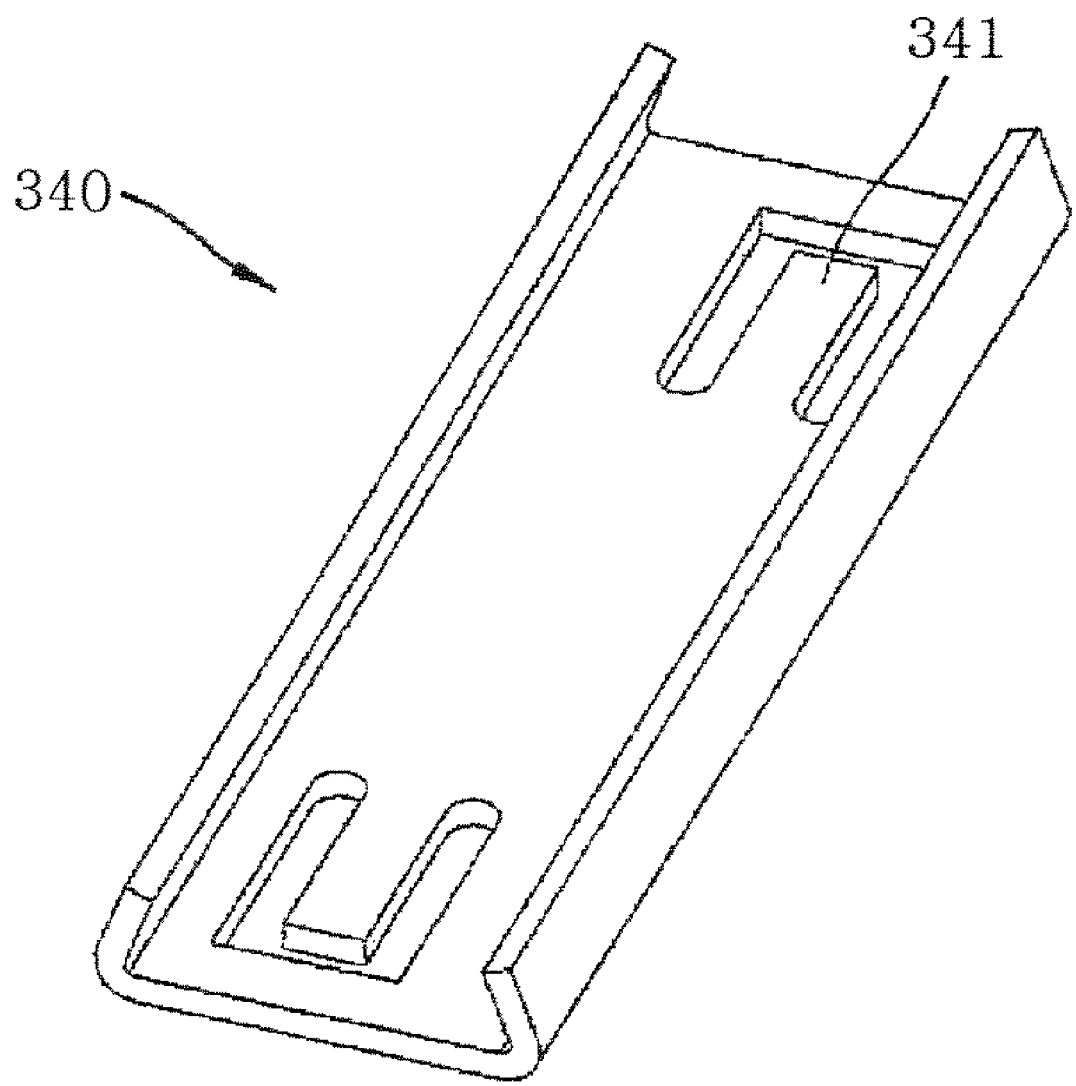

FIG. 7 is a perspective view showing a combined structure between a conductor base and a finger module according to a preferred embodiment of the present invention, FIG. 8 is a perspective view of a structure of the conductor base shown in FIG. 7, FIG. 9 is a plan view of the finger module shown in FIG. 7, and FIGS. 10 to 13 are exploded perspective views of components of the finger module shown in FIG. 7.

First, according to FIGS. 7 and 8, the conductor base 1 according to the preferred embodiment of the present disclosure will be described. The conductor base 1 includes: a coupling plate 100 having a number of coupling holes 110 formed on the peripheral portion thereof; and a connector 200 protruding to a predetermined height in a width direction of the coupling plate 100 and having a curved surface 220 formed on a side of an end portion thereof, the curved surface 220 being tooth-coupled with a contactor 310 (see FIG. 9) of the finger module of the air circuit breaker, which will be described later.

The coupling plate 110 is a rectangular plate-type body, and includes a number of the coupling holes 110 formed on the peripheral portion thereof to fixedly couple the coupling plate 100 to a main body of the air circuit breaker by means of screw-coupling.

The connector 200 is formed in the same width as the coupling plate 100, and protrudes to the predetermined height in the width direction of the coupling plate 100. The curved surface 220 is formed on the side of the end portion of the connector 200 in an inwardly concave form.

The connector 200 has a number of stepped jaws 210 of a predetermined depth formed on the upper end surface thereof in a perpendicular direction to the width direction in such a way that the finger module 300 is not moved in the width direction of the connector 200 after the contactor 310 of the finger module 300 is coupled to the connector 200.

Two connectors 200 are spaced apart from each other at a predetermined interval in a longitudinal direction of the coupling plate 100 to form a parallel circuit and reduce an electric resistance.

To increase a coupling strength between the coupling plate 100 and the connector 200, a connected portion between the coupling plate 100 and the connector 200 is not formed at right angles but its peripheral portion is curved. That is, a section of the coupling plate 100 located between the two connectors 200 is not a '⊏' form but in a ' ⊂ ' form.

In the conductor base 1 having the above configuration according to the present invention, the coupling plate 100 is screw-coupled and fixed to the inside of the main body of the air circuit breaker, and a side of the contactor 310 of the finger module 300, which will be described later, is coupled to the connector 200. Meanwhile, a breaker terminal 400 is selectively inserted to or withdrawn from the other side of the contactor 310 of the finger module 300.

Referring to FIGS. 7 and 9 to 13, the finger module 300 according to the preferred embodiment of the present disclosure will be described. The finger module 300 includes a contactor 310, a plate spring supporter 320, a plate spring 330 and a contactor supporter 340.

The contactor 310 is formed in a plurality at a position. For instance, the contactor 310 is formed at the position where the contactor 310 is tooth-coupled with the connector 200 of the conductor base 1, being laminated in a thickness direction thereof, in which each contactor has a curved surface 220.

The plate spring supporter 320 is formed with an insertion hole 321 for supportively inserting the plural contactors 310 thereto.

The plate spring 330 provides elasticity in such a way that both end portions of the contactor 310 perform a vertical elastic movement relative to the longitudinal center thereof.

A contactor supporter 340 is inserted to the center of the plate spring supporter 320 and is in contact with the lower end center of the contractor 310 so that the both end portions of the contactor 310 can be moved vertically.

The contactor 310 is formed in a plate shape. A portion of the contactor 310 is in contact with the connector 200 of the conductor base 1 while another portion of the contactor 310 is in contact with the breaker terminal 400 so that the contactor 310 serves as a passageway for passing electricity through the connector 200 and the breaker terminal 400. In addition, the contactor 310 includes round-shaped coupling holes 312 formed at both end portions thereof for coupling the plural contactors 310 laminated in the width direction thereof.

The contactor 310 is formed at one side thereof with a curved surface 311 forming a convex arc shaped curve at a margin in a corresponding shape to the curved surface 200 symmetrically concaved at both sides of the contactor 200 of the conductor base 1, such that the contactor 310 tooth-coupled at both sides of the connector 200 can individually rotate.

For instance, a rotational center of a curve line forming the margin of the curved surface 311 is arranged at the contactor 310, and each rotation of the contactor 310 is individually implemented about the rotation center.

Therefore, the contactor 310 adopts an individually rotatable structure to the connector 200 to further provide flexibility and easiness to the coupling with a fixture such as the breaker terminal 400.

The contactor 310 further includes an insertion groove 313 formed at the longitudinal center of the lower end thereof and held on the contactor supporter 340; and stepped seating jaws 314 formed at both sides of the upper end thereof in the longitudinal direction for seating both end portions of the plate spring 330 thereon.

The plate spring supporter 320 has insertion openings 322 formed at centers of both sides thereof for inserting the contactor supporter 340 thereto, and the contactor supporter 340 is coupled to the insertion openings 322.

The plate spring 330 provides elasticity such that both end portions of the contactor 310 perform a vertical elastic movement relative to the longitudinal center of the contactor 310.

The contactor supporter 340 has separation-preventing portions formed on the plate surface thereof for preventing escape of the contactor 310 by being in contact with the circumferential portion of the insertion opening 322 when the contactor supporter 340 is inserted into the insertion openings 322. In this instance, the separation-preventing portions are separation-preventing members 341 formed in such a way that both end portions of the plate surface of the contactor supporter 340 are cut and bent to be inclined at a predetermined angle relative to the plate surface of the contactor supporter 340.

To prevent movement of the contactor 310, the separation-preventing members are formed in such a way as to he opposite to each other relative to the longitudinal central line of the contactor supporter.

Therefore, the separation-preventing members 341 of the contactor supporter 340 are fixed as not to break up the arrangement of the contactors 310 that are stacked at both sides by the plate spring 330, in which the curved surface 311 of the contactor 310 contacts the curved surface 220 provided at both sides of the conductor base 1, such that there is no separation even if the contactors 310 are individually rotated.

For instance, the separation-preventing members 341 are coupled to a separation-preventing groove 323 formed to be opposite to each other relative to the longitudinal central line of the contactor supporter 340 and correspond a position separately formed with the separation-preventing member 341 in the insertion opening 322 of he plate spring supporter 320. The separation-preventing member 341 serves to fix the contactors 310 to prevent the contractors 310 from separating from the plate spring supporter 320 even if the symmetry of the contactors 310 at both sides of the conductor base 1 breaks up. The individual rotational operation by the contactors 310 have an individual rotation center based on the curved surface 311.

The connector 200 of the conductor base 1 is coupled to one side of the contactor 310 of the finger module 300, and the breaker terminal 400 is selectively inserted to or withdrawn from the other side of the contactor 10 of the finger module 300.

Moreover, a contact surface between the connector 200 of the conductor base 1 and the contactor 310 of the finger module 300 is curved, and the plate spring 330 elastically supports the contactor 310 in the vertical direction. Since both end portions of the contactor 310 can perform a vertical elastic movement elative to the longitudinal center of the contactor 310, the finger module 300 can perform a vertical movement at the predetermined interval during a process in which the breaker terminal 400 is inserted or withdrawn.

When the breaker terminal 400 is coupled to the contactor 310 of the finger module 300 even when a predetermined gap occurs, the finger module 300 and the conductor base can prevent damages due to a mechanical impact between the contactor 310 of the finger module 300 and the connector 200 of the conductor base 1 to thereby extend the lifespan thereof. Additionally, the present disclosure can reduce the amount of heat generated by reducing an electric resistance since the contact area between the finger module 300 and the conductor base 1 is widened.

While the present disclosure has been described with reference to the particular illustrative embodiment, it is not to be restricted by the embodiment but only by the appended claims. It is to be appreciated that those skilled in the art can change or modify the embodiment without departing from he scope and spirit of the present invention.

The invention claimed is:

1. A finger module of an air circuit breaker, the finger module comprising:
   a plurality of contactors laminated in a widthwise direction, each of the plurality of contactors having a curved surface formed at a position such that each contactor of the plurality of contactors is configured for being tooth-coupled with a connector of a conductor base;
   a plate spring supporter having two sides forming at least one mounting area for supporting the plurality of contactors inserted into the at least one mounting area, and an insertion opening formed at a center of each of the two sides;
   an elastic plate spring configured for enabling two end portions of each of the plurality of contactors to perform a vertical elastic movement relative to a longitudinal center of the plate spring; and
   a contactor supporter positioned within the insertion opening formed at the center of each of the two sides of the plate spring supporter and in contact with a lower end center of each of the plurality of contactors such that the two end portions of each of the plurality of contactors are enabled to move vertically,
   wherein the curved surfaces of the plurality of contactors are configured to contact a plurality of positions of the connector of the conductor base when tooth-coupled with the connector of the conductor base,
   wherein each of the plurality of contactors is configured to individually rotate at a position of contact with the corresponding connector when tooth-coupled with the corresponding connector,
   wherein the contactor supporter comprises separation-preventing portions formed at two end portions of a plate surface of the contactor supporter,
   wherein the separation-preventing portions are for preventing escape of each of the plurality of contactors when the separation-preventing portions are in contact with a circumferential portion of the insertion opening formed at the center of each of the two sides of the plate spring supporter when the contactor supporter is inserted in the insertion opening formed at the center of each of the two sides of the plate spring supporter, and
   wherein each of the separation-preventing portions includes cut and bent portions of the plate surface of the contactor supporter that are inclined at a predetermined angle relative to the plate surface of the contactor supporter.

2. The finger module according to claim 1, wherein the curved surface of each of the plurality of contactors is formed in a convex shape extending outward from each of the plurality of contactors.

3. The finger module according to claim 1, wherein each of the plurality of contactors further has stepped seating jaws formed at the two end portions of each of the corresponding contactor, the stepped seating jaws configured for seating two end portions of the plate spring.

4. The finger module according to claim 1, wherein the separation-preventing members are formed to be opposite of each other relative to a longitudinal central line of the contactor supporter.

5. The finger module according to claim 1, wherein:
   the curved surface of each of the plurality of contactors forms an arc-shaped curved line at a margin that is configured for being tooth-coupled with the corresponding connector;
   the curved line of each of the plurality of contactors comprises a rotation center; and
   each of the plurality of contactors is configured for rotating individually about the corresponding rotation center.

* * * * *